(12) United States Patent
DuBrucq

(10) Patent No.: US 7,631,506 B2
(45) Date of Patent: Dec. 15, 2009

(54) LIQUID NITROGEN ENABLER

(75) Inventor: Denyse Claire DuBrucq, Cedarville, OH (US)

(73) Assignee: AirWars Defence LP, Cedarville, OH (US)

( * ) Notice: Subject to any disclaimer, the term of this patent is extended or adjusted under 35 U.S.C. 154(b) by 0 days.

(21) Appl. No.: 11/706,723

(22) Filed: Feb. 15, 2007

(65) Prior Publication Data
US 2007/0214808 A1    Sep. 20, 2007

Related U.S. Application Data

(63) Continuation of application No. 10/437,538, filed on May 14, 2003, now abandoned.

(51) Int. Cl.
| F17C 7/02 | (2006.01) |
| A62C 2/00 | (2006.01) |
| A62C 3/00 | (2006.01) |
| A62C 35/00 | (2006.01) |
| A01G 15/00 | (2006.01) |
| E01H 13/00 | (2006.01) |
| B05B 3/00 | (2006.01) |

(52) U.S. Cl. .......................... 62/50.1; 169/43; 169/46; 169/10; 239/2.1; 239/722

(58) Field of Classification Search .................. 62/50.1; 169/43, 45, 46, 47, 11, 10; 239/2.1, 14.1, 239/722
See application file for complete search history.

(56) References Cited

U.S. PATENT DOCUMENTS

| 3,327,704 A | * | 6/1967 | Bartlett, Jr. ............ 128/203.11 |
| 3,830,307 A | * | 8/1974 | Bragg et al. .................... 169/9 |
| 4,817,597 A | * | 4/1989 | Tanaka .................. 128/205.17 |
| 5,180,018 A | * | 1/1993 | Taylor .......................... 169/47 |
| 5,197,548 A | * | 3/1993 | Volker et al. .................. 169/11 |
| 5,327,732 A | * | 7/1994 | De Almeida ................. 62/50.2 |
| 5,590,717 A | * | 1/1997 | McBay, et al. ................ 169/52 |

(Continued)

FOREIGN PATENT DOCUMENTS

GB       2257906  A  *  1/1993

*Primary Examiner*—William C Doerrler
(74) *Attorney, Agent, or Firm*—James F. Boyle; Christopher J. Kukowski; Boyle Fredrickson SC

(57) ABSTRACT

A method and apparatus for using liquid nitrogen to render crises safe, as in circumstances of hostage crises, entering Methamphetamine labs, purging the accumulating toxic or flammable gases, ending the dispersal of substances from aerosols and capturing the material dispersed by condensing it and sealing it in containers for disposal, picking up spills by solidifying them or gelling the material and containing it for disposal—this includes Mercury spills, sealing and repairing broken pipes and dikes and dams, enabling a combustion engine to quit running, changing the conditions in a weather system to counter funnel formation in a tornado threat, strengthening levee structures by freezing the core for the length of the levee when severe crises occur, rapid cooling lava flows to structure the solid lava formation to something useful in that location, purging the coalmine fire environment of Oxygen to quell the long-term blaze, and treating industrial stack gas to useful soot, water and Carbon dioxide components. These methods can apply in wider circumstances and are enabled by either aperture dispersal of Liquid Nitrogen or in pipe evaporation for rapid cooling as the Nitrogen gas emerges and is released safely into the atmosphere.

7 Claims, 12 Drawing Sheets

U.S. PATENT DOCUMENTS

| | | | |
|---|---|---|---|
| 6,401,830 B1 * | 6/2002 | Romanoff | 169/46 |
| 6,502,421 B2 * | 1/2003 | Kotliar | 62/640 |
| 6,666,278 B2 * | 12/2003 | Cicanese | 169/30 |
| 2004/0011881 A1 * | 1/2004 | Morales | 239/2.1 |
| 2005/0269109 A1 * | 12/2005 | Maguire | 169/43 |

* cited by examiner

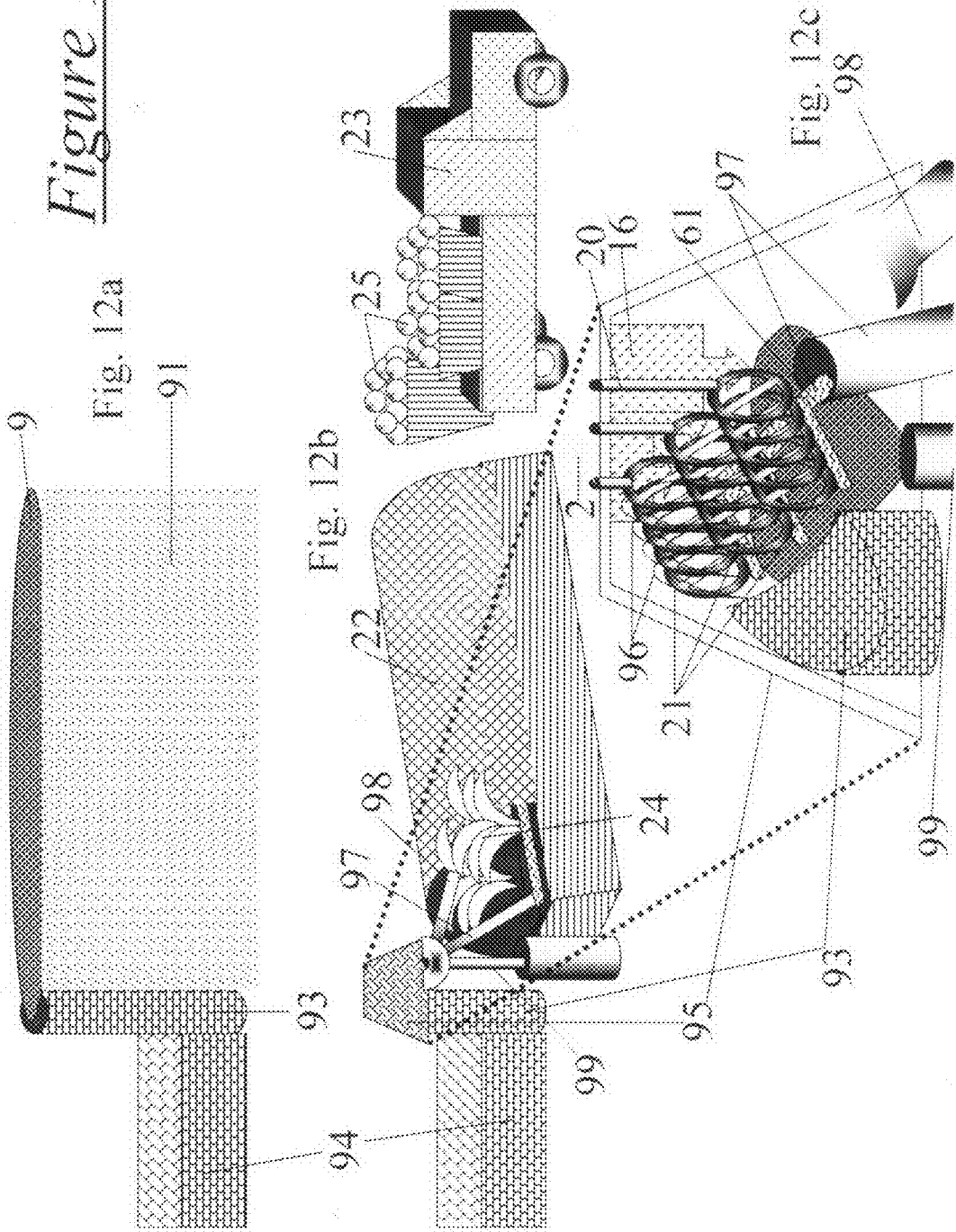

LIQUID NITROGEN ENABLER

CROSS-REFERENCE TO RELATED APPLICATIONS

This is a continuation application of Ser. No. 10/437,538, filed May 14, 2003 now abandoned, and entitled "Liquid Nitrogen Enabler."

BACKGROUND OF THE INVENTION

1. Field of the Invention

The invention relates to a method of applying liquid nitrogen to crises and, more particularly, relates to a method of applying liquid nitrogen to eliminate Oxygen from airmass and to apply cold inert gas to freeze, condense and allow recovery of material.

2. Discussion of the Related Art

The sited related art is mostly for fires and is discussed in the prior continuation application, Ser. No. 11/544,285. These patents include:

U.S. Pat. No. 6,666,278 to Cicanese,
U.S. Pat. No. 5,327,732 to DeAlmeida
U.S. Pat. No. 6,401,830 to Romanoff
U.S. Pat. No. 5,197,548 to Volker The need has additionally arisen to provide a method of applying liquid nitrogen to capture hostage takers, other criminals in and amongst a crowd, and animals out of control safely protecting law enforcement personnel, hostages and the public at large.

Additionally, Liquid Nitrogen can be applied to flood a volume with cold, inert Nitrogen gas in the case of anticipated explosion such that, once people are suitably cleared either fixed Liquid Nitrogen dispensers or inserted dispensers fill the structure or vehicle with Nitrogen gas when there is an unsourced gas leak, Methamphetamine lab activity is suspected or flammables have spilled and remain out of control. Also here, a Nitrogen atmosphere may be maintained through volatile material leaching processes where both the solvent added and the contaminant material could ignite.

Additionally, there is a need to capture by application of cold, inert air released toxins, industrial smoke stack gases and soot, and flooding the porous ground to end coalmine fires gorging these materials into the atmosphere on long term bases.

Additionally, there is a need to recover materials in a spill, chemical or petroleum, so as not to long-term pollute the water or environment, preventing such dangers as fire, poisoning, or irritating pulmonary conditions.

Additionally, there is need to use the cold, inert gas to solidify material in a broken or ruptured pipe or containment, to design the stoppage properly to implement stop flow, trim the break, and apply permanent repair.

Additionally there is need to use the inert, cold gas to stop combustion engine machinery preventing firing of the cylinders, solidification of the fuel, and freezing of moving parts to end unwanted or out of control operation of machinery.

Additionally, the need has arisen to solidify water in a barrier or threatening to be disturbed soil situation as a levee rated below weather conditions anticipated, as an example, or the ground where a mudslide is feared to initiate when heavy rains occur.

Additionally, using the pipe matrix, freezing an ice barrier to a small orifice flooding situation as a cracked dike or break in a dam.

Additionally, using pipe matrices, in catching lava flows such that the lava cools rapidly forming a preconceived structure that will have future usefulness in the new form and location.

And, finally, additionally, to drop Liquid Nitrogen in droplets into a tornado circumstance to disrupt the eminent funnel that can cause destruction through both temperature change and increase of atmospheric pressure in the funnel itself, this being an extension of cloud seeding where Liquid Nitrogen is the choice additive, expanding 250 times its liquid volume when reaching common tornado weather temperatures.

SUMMARY OF THE INVENTION

In accordance with a second aspect of the invention, a method of using liquid nitrogen to flood and cool by dispensing liquid nitrogen as substantially small droplets for fast evaporation and applying it to crises so that the crises are handled and ended.

In one use for the second aspect of the invention, a method of stopping breathing in man and other mammals by eliminating Oxygen in the air they breathe, which stops Carbon dioxide release in the lungs, the triggering mechanism for the breathing reflex. Resuscitation is immediate once Oxygenated air is available and a stroke or two of Artificial Respiration is applied to draw it into the lungs. There is time to apply restraints before bringing dangerous beings back to consciousness and normal breathing.

In another use, the Nitrogen atmosphere is generated in defense against future explosion protecting those in the vicinity, those working the situation and the operation for ongoing use of flammables to insure safety and purity of the chemistry.

In another aspect of the present invention, a method of using the cold, inert air to cause toxins, industrial smokestack exhaust and cooling to extinguish long term coalmine fires can enable collection of gaseous or particle components of the air or smoke or condense it in the ground as coalmine fires become extinguished.

In accordance with another aspect of the present invention, a method of freezing liquid or gas in a ruptured pipe or one with a malfunctioning valve such that the contents of the pipe are frozen in place allowing trimming and capping the pipe. A second freezing can allow removing the caps on the pipe ends and installing the permanent repair. Once thawed, the pipe system is back in service.

In yet another aspect of the present invention, a method of using liquid nitrogen after being deployed by aircraft and showered into a developing tornado cloud, might instigate change in the threatening situation by changing to markedly reduce temperature and raise the air pressure to hinder or disrupt the formation of an effective tornado.

In another aspect of the present invention, a matrix of pipes set into soil or mixture of materials, which serve as the holding soil against mudslide or levee against floodwaters, when crises situations develop as extreme rains or Category #5 Hurricane, Liquid Nitrogen can be poured through the pipe system freezing the water in the soil to components making a concrete hard core the length, width and height of the pipe system.

In accordance with another aspect of the present invention, a method of applying a matrix of piping that with Liquid Nitrogen running through it will freeze water making a barrier or blockage for a small orifice flooding situation like dike breakage or dam rupture. This matrix can be frozen in a slow flow area and drawn into the fast flow at the orifice and guided to lay flat against the ruptured dike or dam segment. As long a Liquid Nitrogen flow continues through the matrix, the ice barrier should hold back the water. Making the matrix cup shaped may allow dike or dam repair before melting the barrier.

To control the flow and leave a desired structure at the end of a lava flow, piping can be set in place ahead of the lava mass in the direction it moves, such that when the pipes are approached, Liquid Nitrogen can be pumped through them cooling first the pipes and then the lava encountering the pipe system to solidify the flow molding it and, using the pipes after solidification to carry water and wiring, a lava stone structure stands.

To control air contamination for existing fires, whether it be long-term coal mine fires or industrial smoke stack sprewing of materials in the air, Liquid Nitrogen can flood the burn zone for coalmine fires and can instantly cool and condense stack gas emissions.

Only Nitrogen can be effective in these circumstances because of the homophobic nature of the Nitrogen molecule ($N_2$). Whether in liquid or gaseous state, a mass of Nitrogen will expel other materials. In liquids, watching a blob of Liquid Nitrogen, I have seen white kernels and black masses accumulating but never mixing with or becoming a solute with Liquid Nitrogen the solvent. The white kernels are both ice—water frozen—or dry ice—Carbon dioxide frozen. Black kernels can be dirt, soot, anything that is carried by, but not mixed in with, Liquid Nitrogen.

Gaseous Nitrogen as it is generated will stay in a homogeneous cloud of Nitrogen unless a disrupting wind of five miles an hour or stronger whips it into a mixture of air gases, as swirling in Oxygen, Argon, water, Carbon dioxide, and other components. It is this exclusivity, homophobicness that allows the Nitrogen cloud to eliminate Oxygen from a fire, from breathe intake, from combustion engines requiring Oxygen in the air mix, and from a potential explosion situation. In engineering dispersal of a toxin to the point where it is ineffective, if that is a desired thing, Nitrogen gas will clear away other components of the air.

Neither Liquid nor Gaseous Nitrogen conducts electricity so putting out spark gap ignition works effectively as when one floods a building with a discovered gas leak or flammable materials as in a methamphetamine lab. It also solidifies or gels greases and oils rather than splattering them as happens when water is poured on a burning hydrocarbon. These wonderful traits of Liquid and Gaseous Nitrogen make it possible to end crises without fear of changing the nature, the shape, the composition, or dissolving anything that is causing the crisis or staging the situation to initiate a crisis.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

In FIG. 10a, the front component shows new lava form. A rear view of the finished form is shown in FIG. 10B.

FIG. 12 shows means to capture the industrial smoke stack emissions, condensing them before they enter the atmosphere to pollute the air with FIG. 12a showing the smokestack and FIG. 12c showing the details of the capture system. Reuse of captured components is recommended. One such use is running components through a green house system shown in FIG. 12b. Capturing the water from the smoke lets the particulates drop. Carbon dioxide run through a lighted greenhouse will cause plants to photosynthesize exchanging the Carbon dioxide for Oxygen. The water irrigates the plants. The soot can be mixed into the soil or compressed into charcoal shapes and burned.

DETAILED DESCRIPTION OF THE PREFERRED EMBODIMENTS

1. A First Embodiment of the Present Invention

Turning now to the drawings and initially to FIGS. 1-7, a method of applying Liquid Nitrogen to a region using a spaced-hole sieve applying Liquid Nitrogen in droplets upon material needing cooling to condense, gel or solidify. The holes 11 are provided so that upon introduction of the liquid nitrogen into the pan 10, the liquid nitrogen flows to fill the pan leaking out of the holes 11 under the force of gravity, thus generating an area of "raining" Liquid Nitrogen falling towards the surface below. The application of Liquid Nitrogen in this manner will generate a substantially gaseous application of Nitrogen, thus resulting in a substantial volume of inert Nitrogen gas forming a pure Nitrogen cloud, and cooling the air and the surrounding surfaces.

Figure 1:
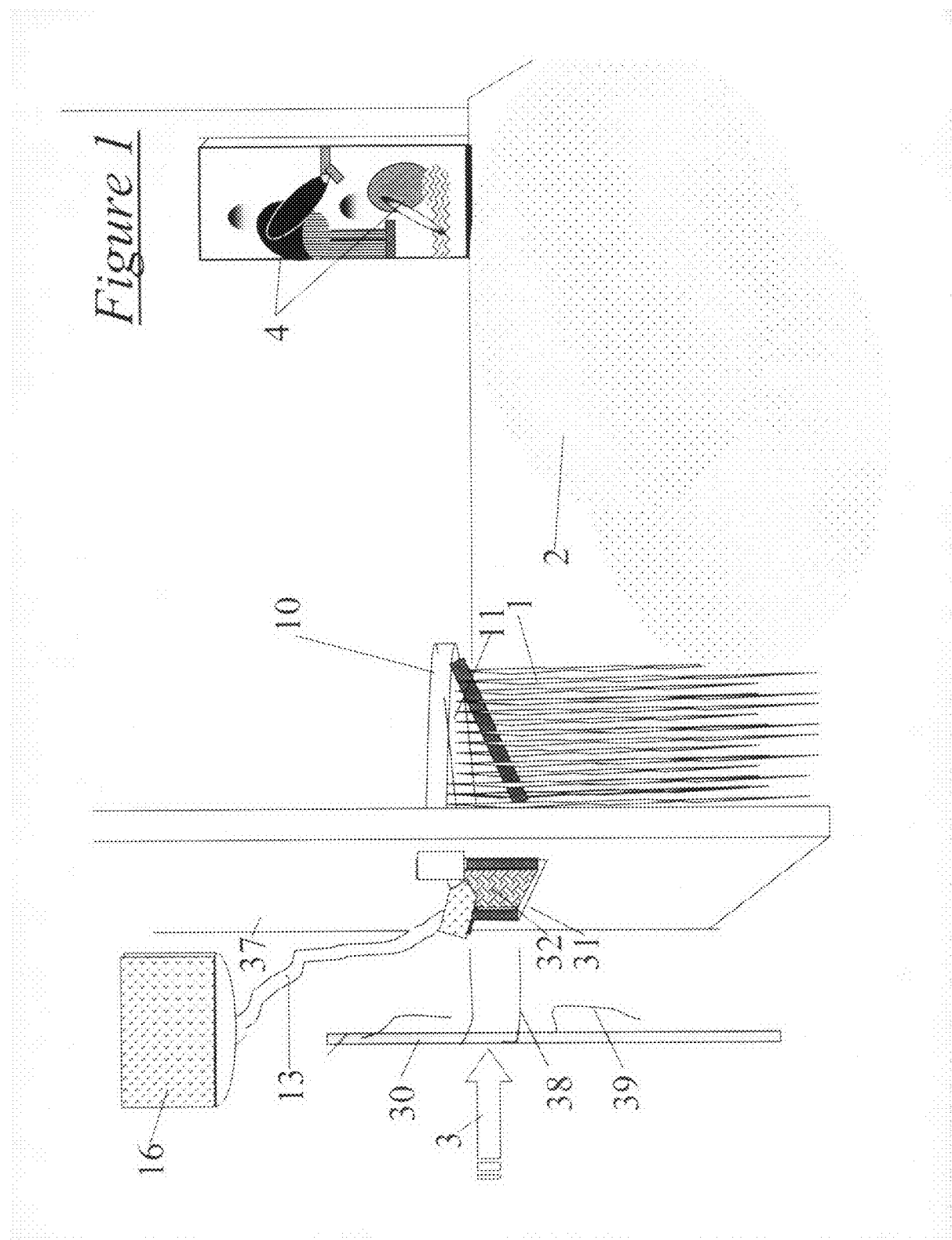
FIG. 1 shows a half-circle pre-set Liquid Nitrogen dispenser having flooded a building where hostages have been taken. Emergency responders have adequate Oxygen masks in hand to enter the building and resuscitate everyone and handcuffs and any other restraints for the hostage takers. This can apply to Methamphetamine Labs as well.

Turning now to FIG. 1, an exemplary illustration Liquid Nitrogen use as a non-lethal weapon here in a human crisis as a hostage crisis or Meth Lab entry where the fixed Liquid Nitrogen dispenser 10 is filled with Liquid Nitrogen 1 from a dewar 16 and cryogenic hose 13 applied from outside the building. The Liquid Nitrogen 1 flows into the dispenser 10 through the spaced holes 11 dropping to the floor. As the Liquid Nitrogen drops through the warm air, it evaporates forming the gaseous Nitrogen cloud 2 which progressively fills the space. As the application continues, the adjacent room where people 4 are located floods with Nitrogen and the lack of Oxygen in the air breathed triggers a lung based reflex that sets the person unconscious when the Oxygen-Carbon dioxide exchange in the lungs ceases. All parties in the Nitrogen atmosphere will enter a coma phase as they breathe pure Nitrogen gas. This makes it imperative that those applying the Liquid Nitrogen be prepared to enter the building and to administer Oxygenated air to those in Nitrogen coma within six minutes of being stricken. That is sufficient time to handcuff and otherwise restrain criminals as hostage takers or Meth Chemists and to cage aggressive animals restrained in this way. All afflicted must be provided the Oxygenated air and a few strokes of artificial respiration to bring them around to consciousness.

This Nitrogen Coma situation protects those caught in situations like explosive mixtures in the air preventing their further breathing in the flammable gases and in fires from breathing in the smoke toxins and even the burning gases in the air which will ruin the lungs to normal function, exacerbate Asthma conditions and weaken pulmonary function. Among industrial accidents, in the confined space category, Nitrogen asphyxiation is a leading cause of deaths—around 61% of the Oxygen depleting deaths. Where in methods in this patent application, we are using the condition to make capture safer and prevent lung damage in crises, in industrial accidents deaths happen when one person sees another down. The first assumption is "Heart Attack" and a co-worker hastens to their side only to be breathing the same Nitrogen gas, deplete of Oxygen, and later people find both normally healthy workers dead. If only OSHA and other safety groups would warn people to prepare for Oxygen depletion and grab an Oxygen mask for themselves and one for the victim, then these circumstances would not be a death threat in industrial situations. If the person was in Nitrogen Coma, they would be recovered with application of the mask and a few strokes of artificial respiration. If the person had a heart attack, then the CPR and other procedures can be applied to the person breathing well. The American Heart Association would not entertain industrial defibulator installations having a few Oxygen masks in the emergency kit to prevent the Oxygen depletion deaths in the workplace. That is most unfortunate.

A few more items shown in FIG. 1 include what might be used were the first responders bringing the Liquid Nitrogen dispensing unit to the scene. Developing an opening in a window 31 or wall 37, one uses a wind-indicator pole 30 with light-weight ribbons that droop with no wind 3 as for ribbon 39, or blow away from the wind 38 when in the breeze. After the Liquid Nitrogen dispensing unit is inserted in the opening 31, to prevent outside air from mixing with the Nitrogen gas, a covering 32 is inserted to block airflow from outside the target area in the building. An inserted dispenser can be markedly smaller and more stealth than what is shown 10, so as not to arouse curiosity.

Figure 2:
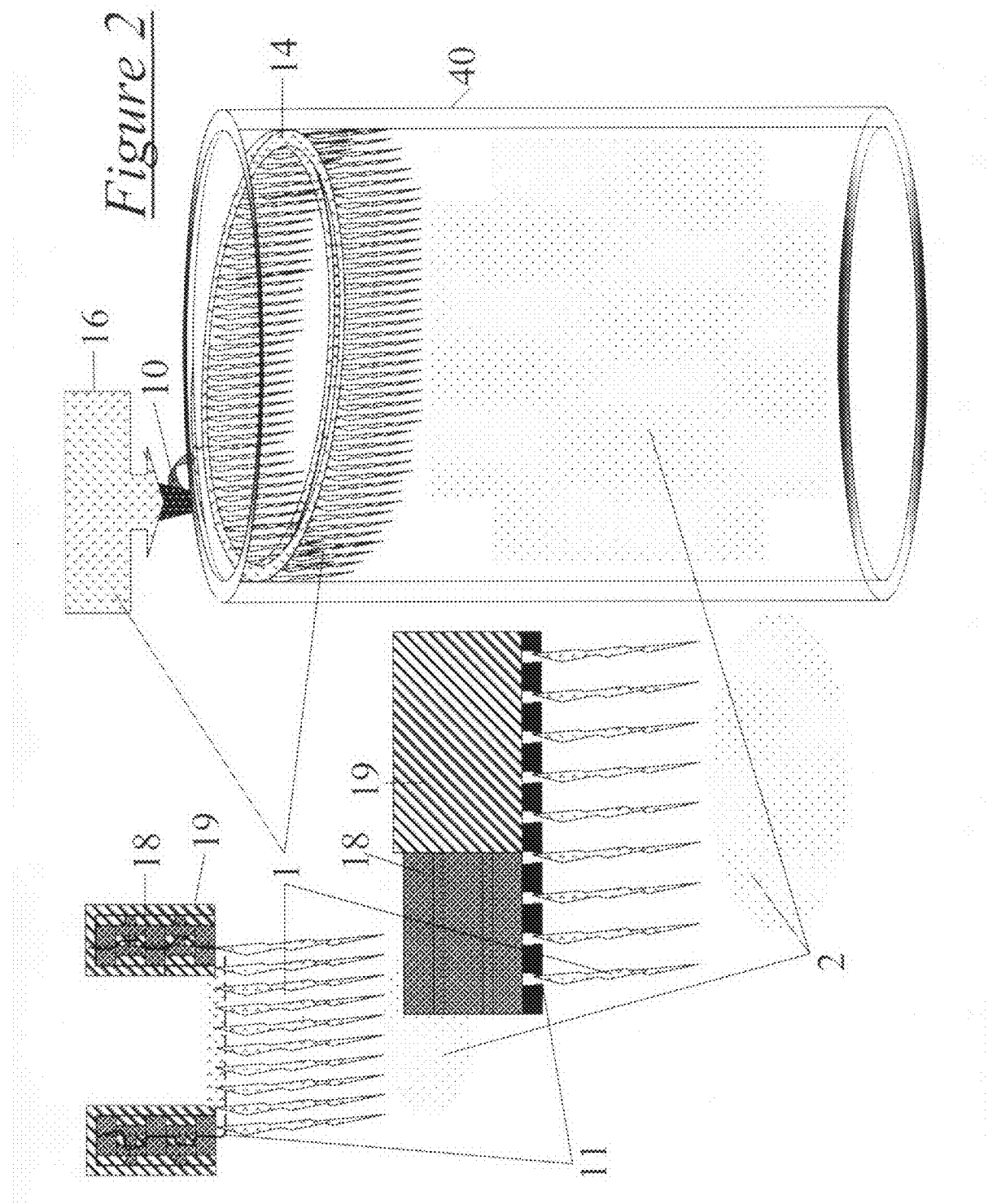
FIG. 2 shows precautionary flooding with Nitrogen gas, areas where an explosion may be anticipated either on discovery of a situation or, when operating chemical processes with flammables, one chooses to work in a cold, inert, defined atmosphere.

FIG. 2 shows another embodiment of the present invention wherein a facility 40, here resembling a silo or storage chamber, where a flammable situation may develop, as with accumulating Methane Gas in a corn storage unit, has a built in Liquid Nitrogen dispenser 14 into which a dewar of Liquid Nitrogen 16 is emptied such that gaseous Nitrogen 2 displaces other gases accumulating in the facility 40, purging the explosive gases as it billows out from the pressure of the Nitrogen gas dispensed into the chamber. The funnel, 10, is built into the fixed Nitrogen dispenser system 14. The expanded views of the fixed system 14 include the spaced sieve holes 11, and trough walls 18 inside for sliding adjustment and 19 outside to seal Liquid Nitrogen in the trough. Had the Falk Corporation used a Liquid Nitrogen rather than a water sprinkler system in their aging facility in Menomonee River Valley industrial area in Milwaukee in late fall, 2006, the gas leak that occurred might have not exploded damaging vehicles and buildings over a mile from the site. They got everyone out. Then they should have flooded the facility with Nitrogen before the four member repair crew, who perished in the explosion, went in. It would have been safe because the Nitrogen gas would pillow the leaking natural gas in bunches surrounding it with an Oxygen depleted atmosphere which couldn't support an explosion. It also won't support electrical shorts which might ignite the gas.

Figure 3:
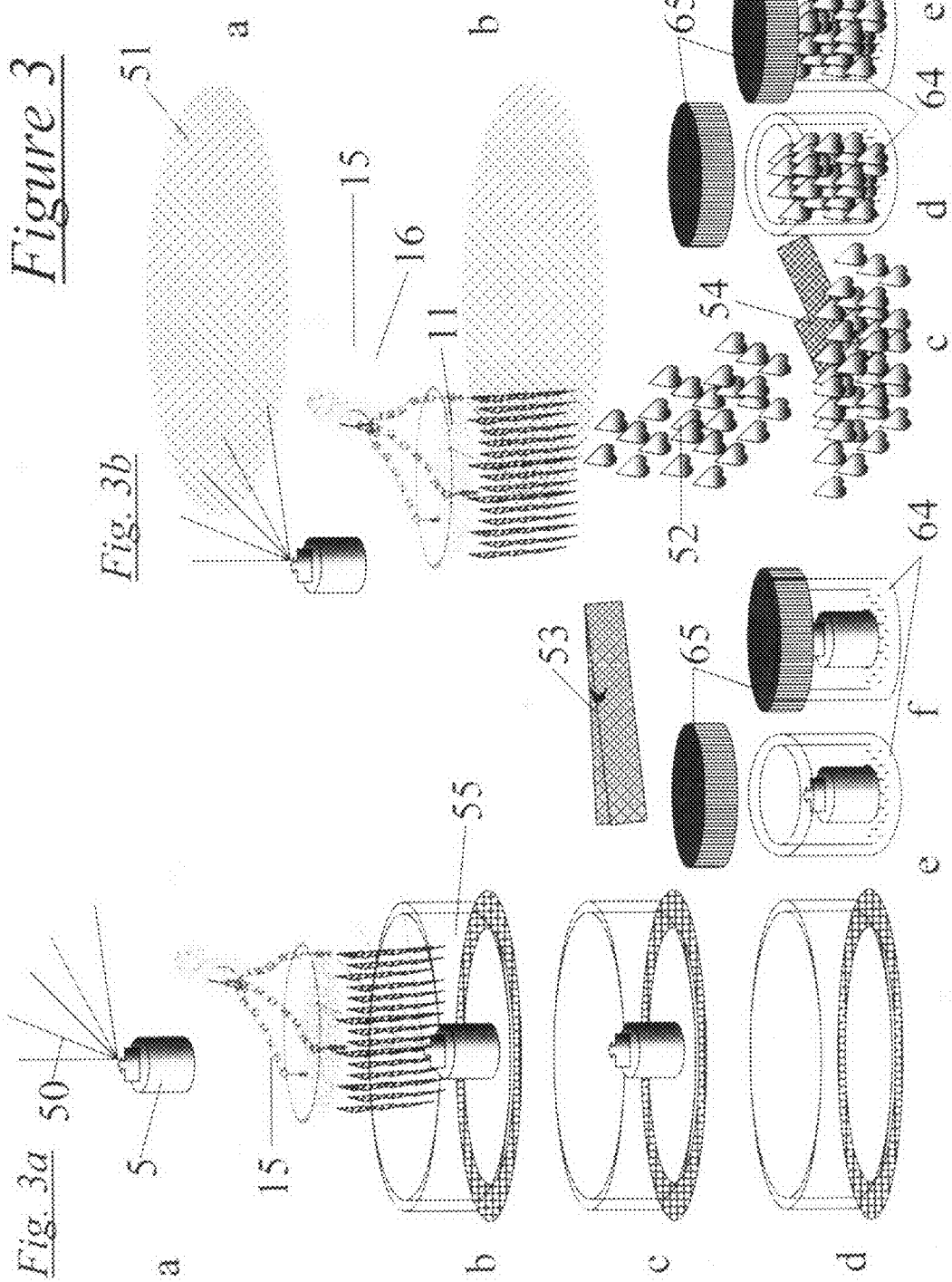
FIG. 3a is a view of direct Liquid Nitrogen rain on an aerosol spewing a toxic substance freezing the substance in the can shown in steps a-f. A mason jar with cap can contain the frozen aerosol to prevent further disbursement of the toxic substance.
FIG. 3b is a view of the sieve for direct application on a toxin cloud, which could be supplemented with cold water, if needed, to condense the toxin out of the air shown in steps a-e. The frozen toxin crystals or pellets can be shovelled up and sealed in containers for disposal.
Figure 4:
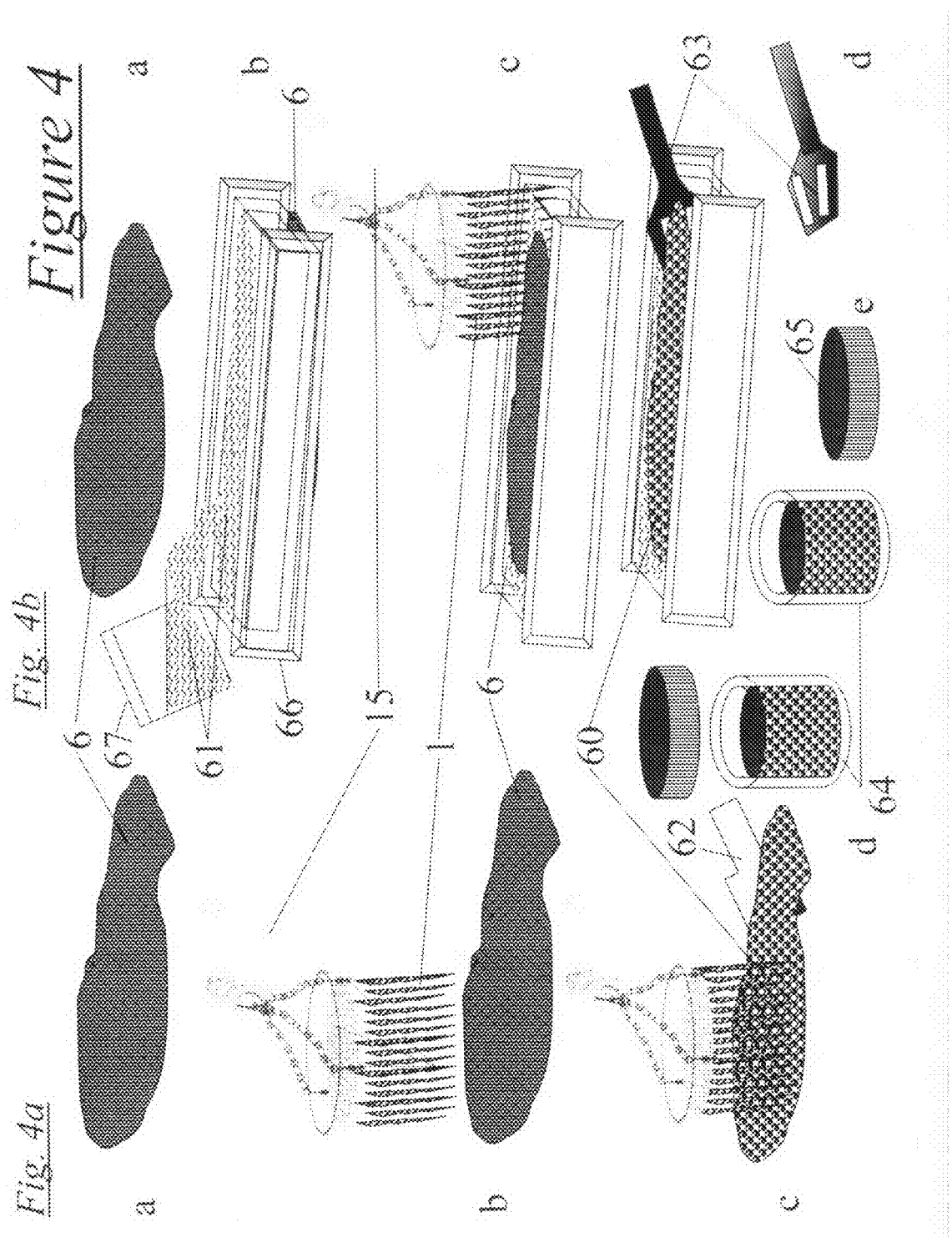
FIG. 4a is a view of the sieve for cooling a spill to gel or solidify the material for pick up shown in steps a-e.
FIG. 4b shows cleanup if the surface doesn't allow easy removal of solidified material, flood the area with water to lift the spill and then solidify it using a skimmer to pick up the material shown in steps a-d.
Figure 5:
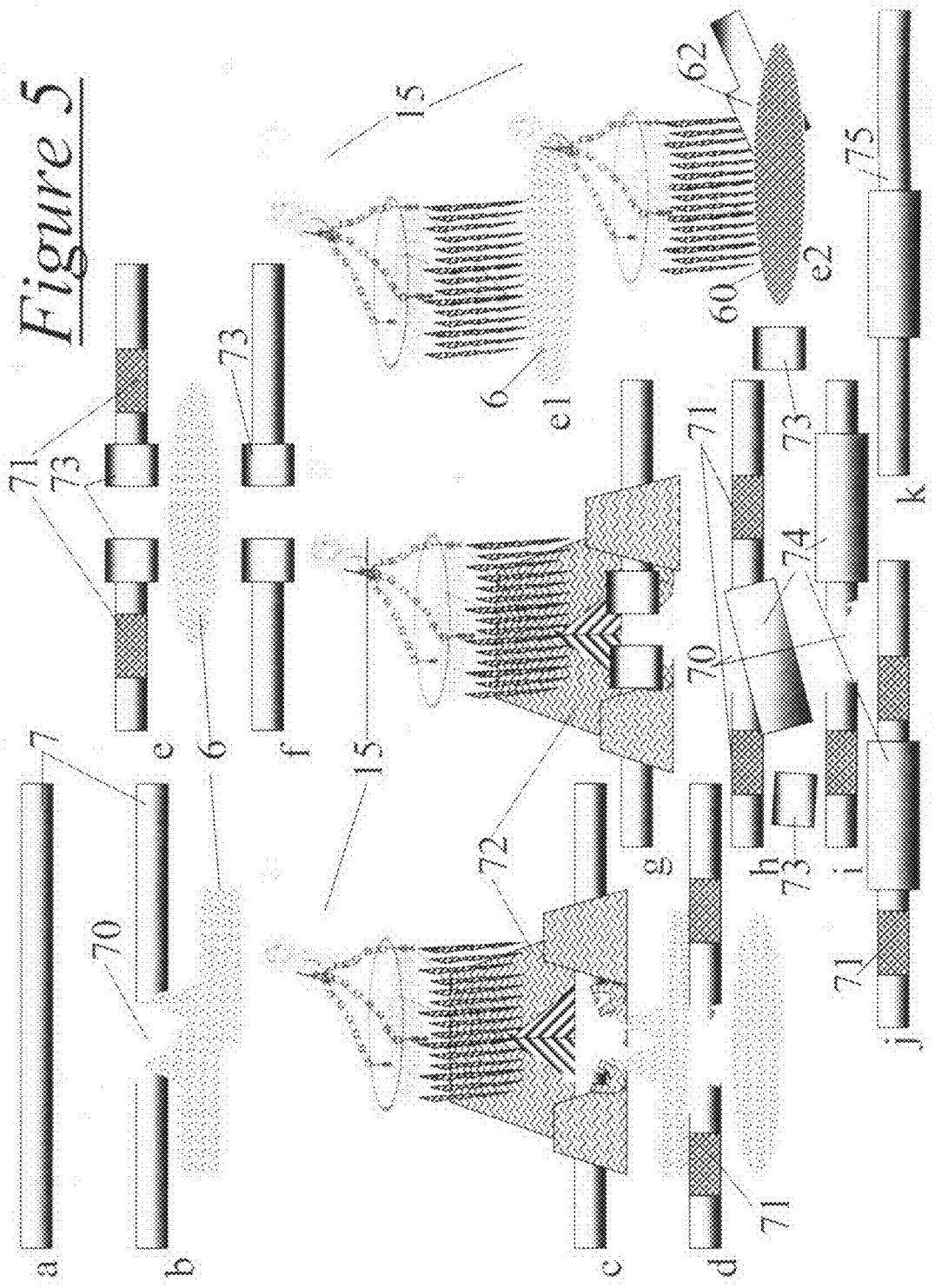
FIG. 5 shows a sequence used to stop the flow from a ruptured pipe, sealing the broken ends followed by refreezing and repairing the breakage and returning the pipe to service shown in steps a-k.
Figure 6:
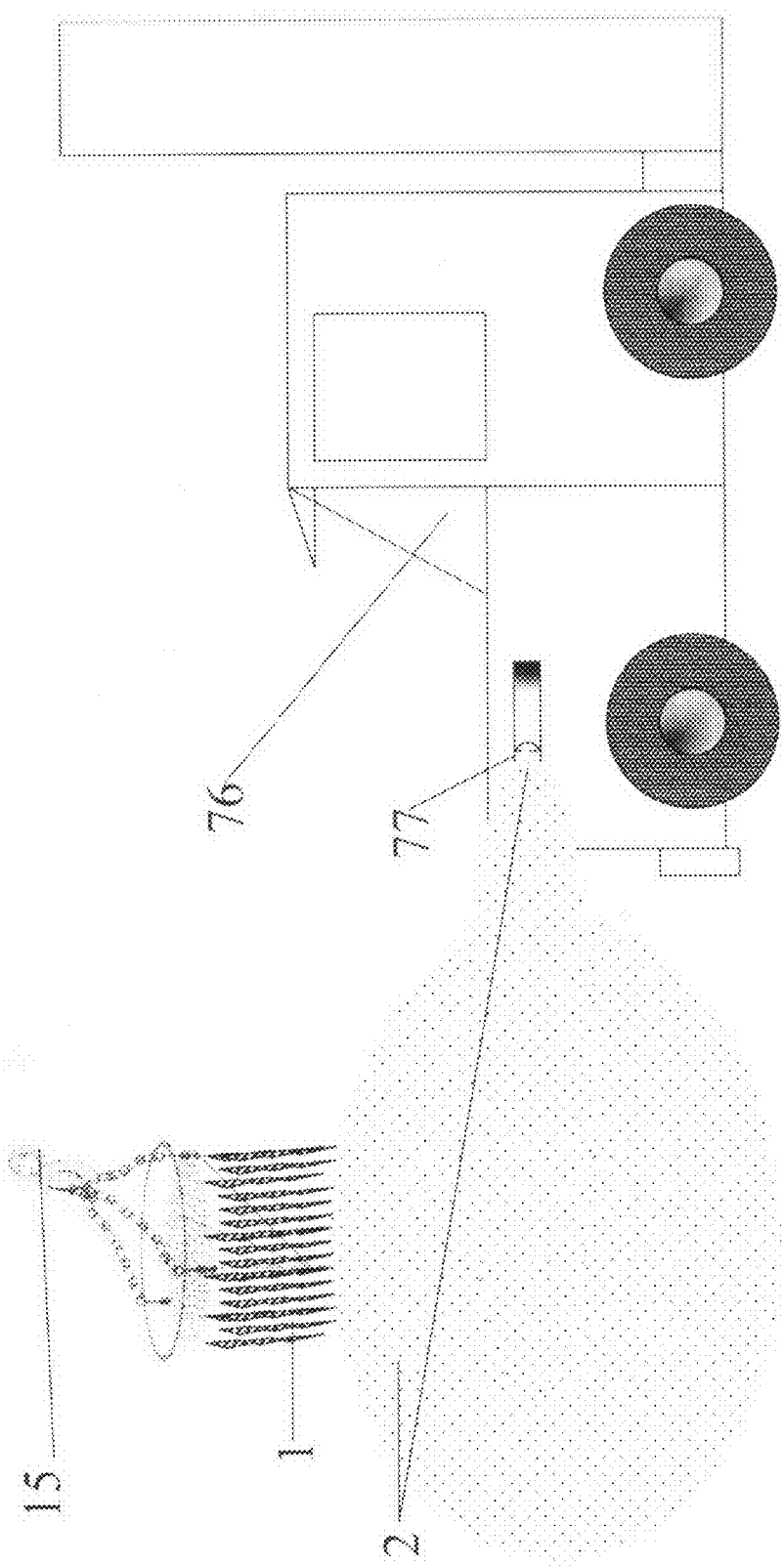
FIG. 6 is a schematic illustration of how to put combustion engine machinery out of operation by flooding air intake with Nitrogen gas and, at the same time, severely cooling engine and battery.
Figure 7:
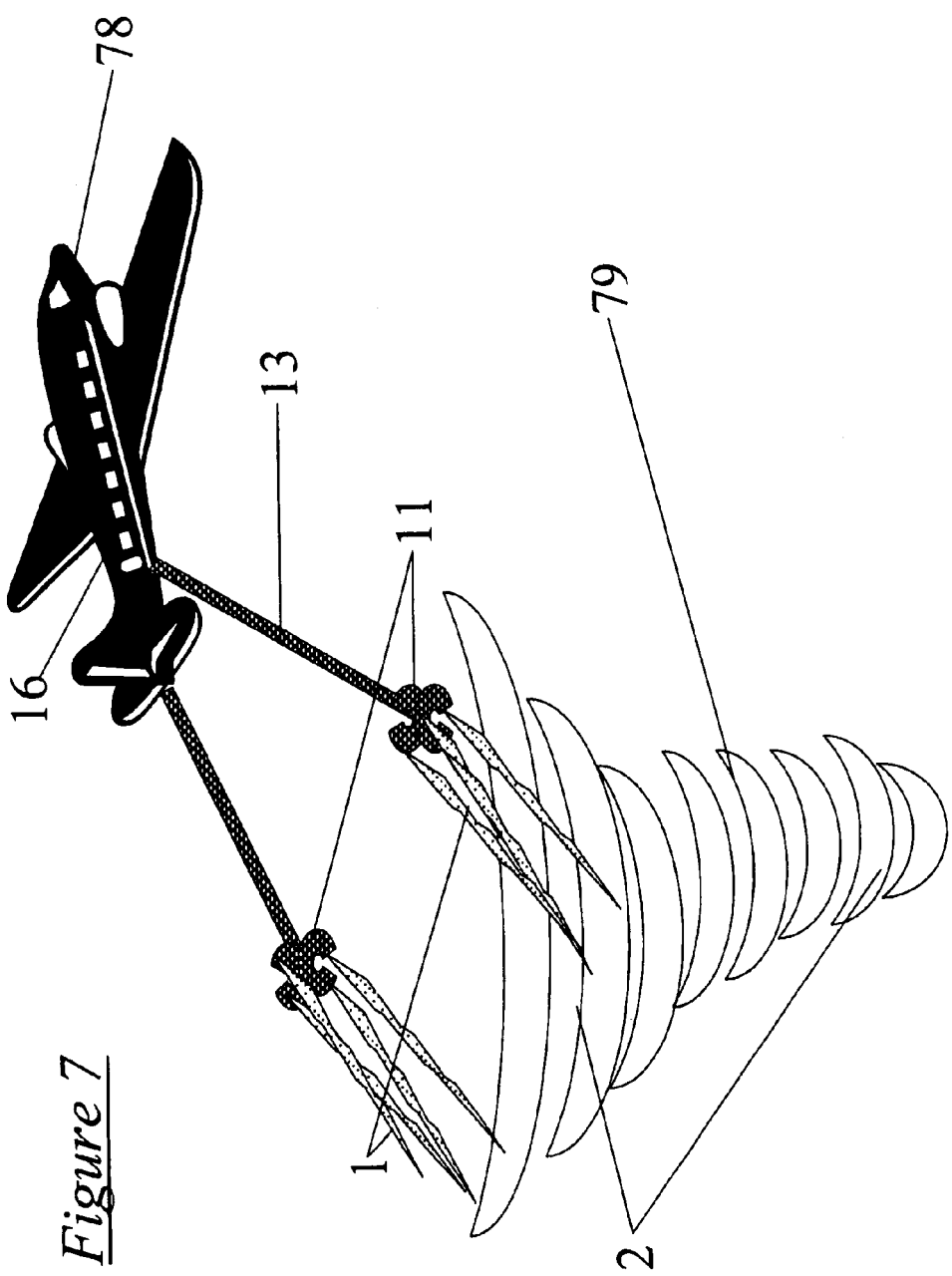
FIG. 7 is a schematic view of an aircraft delivering a quantity of Liquid Nitrogen for dissipating into a tornado cloud to change the convection flow, thermal patterns that might support tornado activity imminently, and by increasing the air pressure in the storm cloud.
Figure 8:
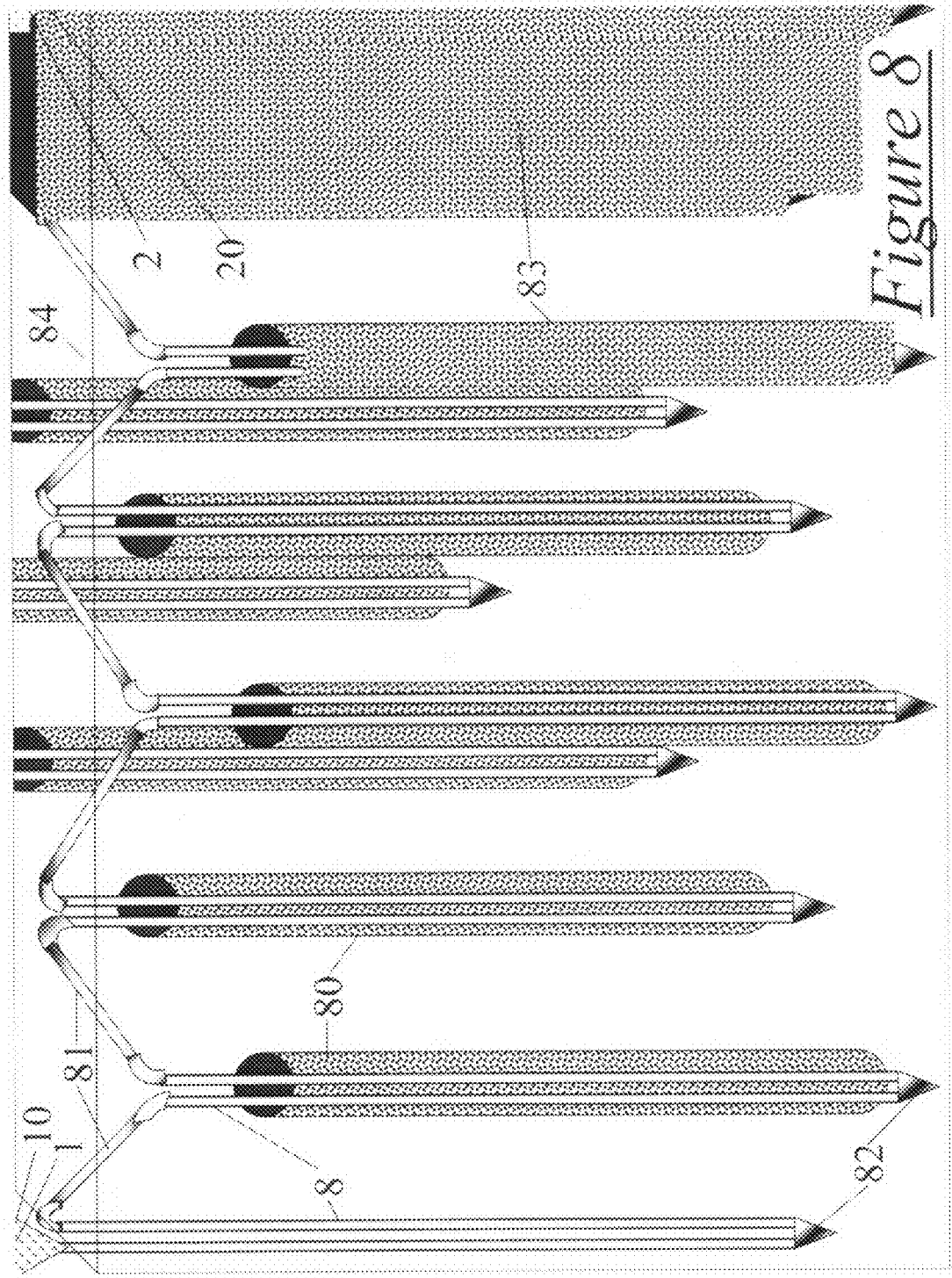
FIG. 8 is a pipe matrix, this one installed in soil or composition structure as a suspected mudslide area or levee holding water back. When crises threaten, Liquid Nitrogen is run through the pipe systems freezing the suspected mudslide areas or levees.

Turning now to FIGS. 3 through 5 where sequences of application are shown designating the order of events using letters in alphabetical order. FIGS. 3 and 4 have two sequences to handle situations of toxin release and spill cleanup options. FIG. 5 takes one through handling a broken pipe incident from stopping the flow, picking up the spill, and on refreezing the pipes, taking off the caps and inserting the repair segment of the pipe to put the system back in working order.

Looking at FIG. 3, FIG. 3a, an aerosol 5 is representing spewing toxin 50 in a situation like a subway tunnel. Once discovered, the attendant should have a Liquid Nitrogen dispenser 15 and a ring unit 55 that tucks tightly to the ground or concrete keeping the Nitrogen gas around the aerosol to hasten cooling when Liquid Nitrogen 1 is applied. As the Nitrogen evaporates, the extremely cold, inert gas quickly cools the aerosol which stops the toxin release. Once this stops, the attendant can try to close the aerosol can or can lift the aerosol with the tongs 53 and place the aerosol in a jar 64 and applying the tight fitting, leak-proof cover 65. This act reduces the total toxin released by the amount that was frozen in the aerosol before it was sealed in the jar to safely transfer to authorities for testing and disposal. Toolkit for Toxin capture: Liquid Nitrogen dispenser 15 filled with Liquid Nitrogen 1; ring unit 55; tongs 53; jar 64 and cover 65.

FIG. 3b shows means to reduce the toxin content of the gas released by the aerosol 5 or by any other means. Not shown is a water vaporizer which might aid the toxin capture if sprayed on the toxin cloud 51. Cooling the cloud by dispensing the Liquid Nitrogen just above it will cool the air such that the toxin might condense to liquid and, maybe, depending on what the toxin is, then crystallize and fall like snow or pellets 52. The water vapor added may hasten the pellet formation of some toxins. Once condensed, the toxin can be shoveled up. Aspirating the pellets might release the toxins undoing the capture. Flakes or pellets 52 are shoveled up into jars 64 and sealed with tight fitting caps 65. Again, the contained toxins should be turned over to authorities for identification and disposal. Toolkit for Toxin Cloud capture: Liquid Nitrogen dispenser 15 with Liquid Nitrogen 1, water vaporizer, shovel 54, jar 64 and tight fitting cap 65.

FIG. 4 contains two ways of picking up a spill 6. The first in FIG. 4*a* shows a spill that can be scraped off the surface with a shovel 62 after the spill is gelled or solidified 60. This method can work effectively in the event of Mercury spills. The second in FIG. 4*b* shows a spill that has to be first lifted to the surface of water 61, like most organics, using pliable base, open bottomed containment 66 which snugs to the surface preventing the water 61 or spill 6 from leaking out. Once the water 61 is in the containment 66, which is placed over the spill 6, the spill rises to the top. Then the Liquid Nitrogen dispenser 15 is used letting Liquid Nitrogen droplet streams drop over the spill cooling the spill with the evaporating Nitrogen until it gels or solidifies 60. A skimmer with holes or slots to release as much water as possible is used to skim the gel or solid from the water surface and to place it in jars 64 which can be tightly sealed with a cap 65. Toolkit to collect spills: Liquid Nitrogen dispenser 15 with Liquid Nitrogen 11; shovel 62; skimmer 63; pliable base, open bottom containment 66, water 61 to fill the containment in a jug 67; and jars 64 and tight fitting caps 65.

FIG. 5 illustrates another embodiment of the present invention, wherein the present invention is used to stop the flow from a broken pipe, seal it, then refreeze the contents and apply the fix so the pipe is again functioning in the system. Steps a through e stop the flow from the pipe. Then e1 and e2 show cleaning up the spill from the pipe. Image f shows the pipe stopped so no further spill is experienced. Images g through j show the sequence to uncap the pipe and insert the repair pipe segment. Image k shows the repaired pipe back in service. Pipe 7 experiences a break 70 which causes a spill 6. The Liquid Nitrogen dispenser applies Liquid Nitrogen into a double pronged hammock like canvas material catch 72 which cradles the cold, inert Nitrogen around the two segments of the broken pipe. This stops the flow from the pipe segments by freezing the pipe contents 71. Caps 73 are inserted on both ends of the broken pipe. The second stage of pipe repair starts with again cooling the pipe segments with the catch 72 using the Liquid Nitrogen 1, removing the caps and inserting a pipe segment 74, pushing it up the pipe a ways and then bringing it to the center covering the break 70. It is soldered or adhesive sealed in place. Once the frozen pipe contents 71 thaw, the repaired pipe 75 is back in service. Toolkit required for pipe flow stop and repair includes the Liquid Nitrogen Dispenser 15 with Liquid Nitrogen 1; the dual-pronged canvas catch 72; two caps 73 to fit the pipe; the shovel, jar and cap to remove the spill; and the repair pipe segment 74 to fit the pipe and the solder, torch, or adhesive to seal the repair part in place.

Referring now to FIG. 6 another embodiment of the present invention is illustrated, wherein the present invention is used to control combustion engine vehicles 76 by creating a Nitrogen gas cloud 2 by dispensing Liquid Nitrogen 1 from a unit 15 in such a manner that the Nitrogen gas 2 enters the engine area and goes into the air intake 77 of the vehicle 76 engine. This will stop the engine. It would be a method of stopping the engine if one left one's car keys in the vehicle and locked the door. Once help to enter the vehicle is gotten and one enters the vehicle, the Nitrogen gas is gone and the vehicle should start when turning the keys without any problem.

FIG. 7 shows a means for a cloud seeding aviation group to possibly change the character of a tornado situation by overflying the funnel producing sections 79 of a major storm with an aircraft 78 containing a Liquid Nitrogen dewar 16 of vast capacity with cryogenic piping from the dewar out the rear of the aircraft to two dispersing nozzles 11 which let the Liquid Nitrogen 1 stream out the back and evaporate filling the cloud system with Nitrogen gas. Theoretically, with 4,000 gallons of Liquid Nitrogen dispersed into a serious storm cloud, 1,000,000 gallon volume of Nitrogen gas is added to the air in the cloud. The evaporation lowers the temperature changing the building structure of the funnels, it adds air to the mass increasing the air pressure from the super low pressure characteristic of tornado cloud situations to a higher pressure, and it reduces the water portion of the storm cloud with the added volume of dry Nitrogen gas. This surprise set of changes might forestall the development of the funnels that cause the tornado damage. It is a risky flight. It may increase the size of hail dropped on the region. We have no way of knowing the degree of severity of any tornados that might form so there is no second guessing. However, when a storm system as passed over central Florida in late January, 2007, where tornados were forecast, it might have changed the quality of tornado or mixed the turbulence enough to nix the tornado formation. In the spirit of uses of Liquid Nitrogen of this patent, it fits. Whether it will be useful for weather modification will only be determined by trying the method when severe tornados are a given in an exceedingly severe storm situation. If, with an approaching storm of this magnitude, people yell, "Do something!" This is something one can do. It takes a very secure aircraft, a highly skilled pilot with nerves of steel and one really huge tank of Liquid Nitrogen with the dispersing elements controllable from the pilot's location or with a weather expert viewing the cloud changes having the dispersion controls.

2. A Second Embodiment of the Present Invention

Referring now to FIGS. 8-10 we use the brute force of freezing water or solidifying lava to mitigate the crises of hurricane or loose barge damage to levees and holding the soil in place where mudslides might originate in heavy rains shown in FIG. 8; the freezing of a plug or high side cap on a dike breakage or dam rupture in FIG. 9; and the structuring of the potential solidification of lava in a lava flow region in FIG. 10. Nitrogen dispersal equipment here, following the funnel catching the dewar output, is mainly piping placed in advance in the levee and mudslide vulnerable areas; put in place at the event of a dike breakage or dam rupture to match the size and convolution of the structure; and designed and set in place as the lava flows toward it considering in its design the configuration of the lava bed after the flow is solidified in place. This last lava effort calls for real dynamic architecture.

FIG. 8 shows the advance installation pattern of pipes 8 placed in holes 80 in the levee. These holes are recommended to go into the ground somewhat deeper than the levee to insure it doesn't slide downstream once the ice/gravel block is frozen. The pipes 8 penetrate the depth of the hole and extend above the surface clearing the water during construction. The system must be sealed, water tight, and be dry inside to prevent ice blockage. Once the double row of pipes are installed the width of the levee or distance preferred, then the holes with the pipes in them are filled with gravel. And, with the holes filled, then the tops of the pipes are covered to six inches over the pipe cross sections 81 as shown in gravel addition 83. The double funnel 10 is capped at one end of the levee where a Liquid Nitrogen truck can dump its load of Liquid Nitrogen as the crisis threatens. Also, the exhaust ends 20 of the pipe are capped and clear the top. When the system is being filled, caps at both the funnel 10 and the exhaust end 20 of the system must be removed. A chimney cover to prevent water entering the exhaust end is needed and a mixing fan installed to mix the air at the exhaust end of the pipe system to disrupt any pure Nitrogen clouds 2 that might cause Nitrogen Coma in any life in the vicinity of these pipes. A fan mixing the air at a speed over five miles per hour will blend the Nitrogen in the air which, as you know contains 78% Nitrogen. The zigzag pattern run double with hole spacing twice the peripheral freezing range will, if the spacing between hole margins is eighteen inches and having parallel zigzag lines should allow a four foot thickness of the freeze zone 84 for the depth of the pipes plus six inches at the bottom and six inches at the top by the width these pipes are installed. If the gravel/ice block 84 is the full width of the levee, then when a crisis occurs where levee strength is critical, that size solid block of gravel and ice is formed by administering Liquid Nitrogen in advance of the situation and keeping the Liquid Nitrogen flowing through the duration of the crisis. The explanation of this method of increasing the strength of levees was proposed to FEMA Asst. Director Michael Brown Jun. 7, 2005. Aug. 18, 2005, FEMA turned down the request to test the method. Katrina, a Category #5 Hurricane, hit August 28 and August 29 New Orleans levees failed. Halliburton's repair of the levees is up to but not beyond Category #3. The US Army Corps of Engineers has the request to test this method, but to date has not done so. California is reported levee problems currently with levees built before their recorded history. This method might strengthen these old levees in times of crisis. The cost of piping the levees might be less than replacing them and getting them to the strength needed to withstand the type storms anticipated in these present days.

Figure 9:
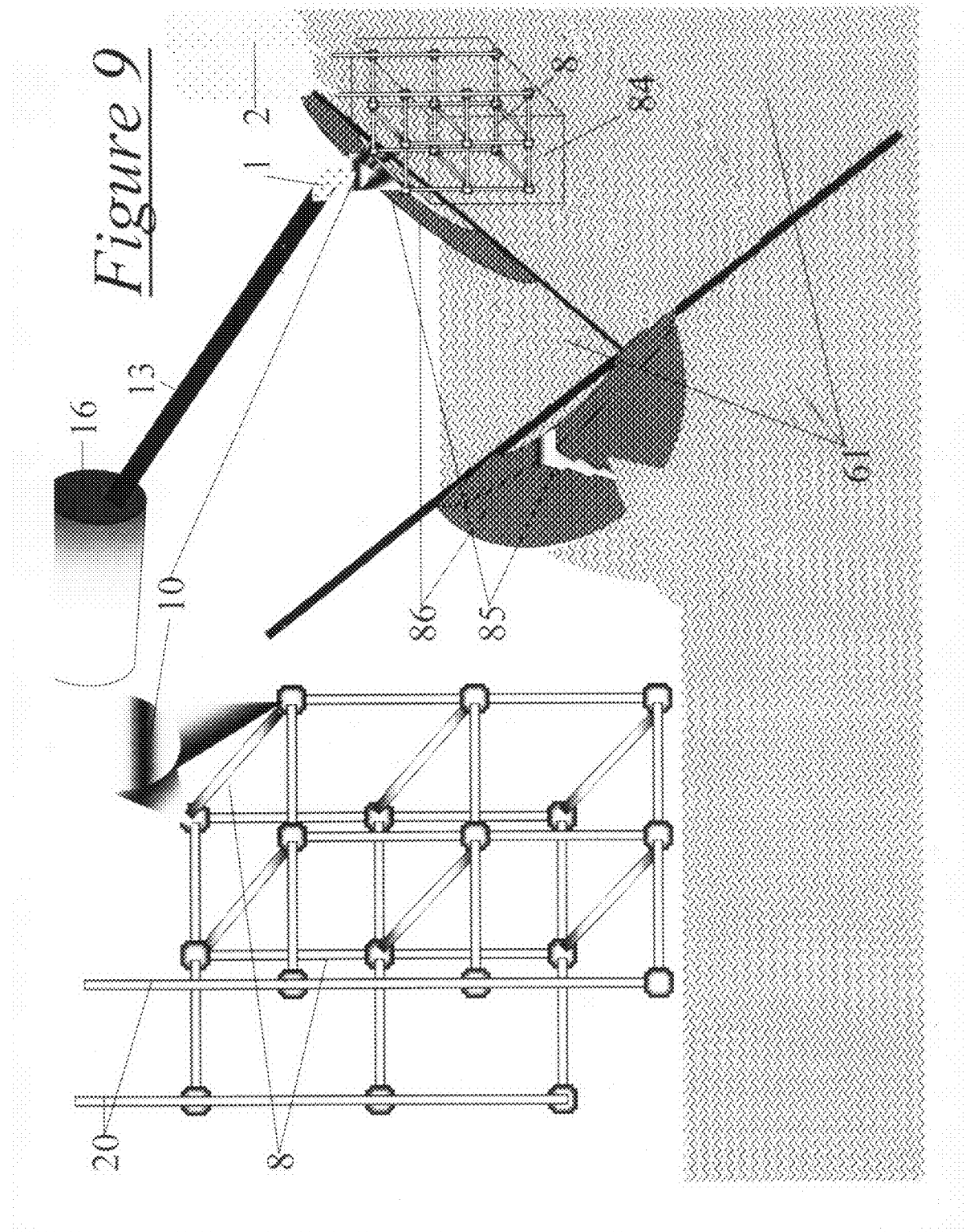
FIG. 9 shows another pipe configuration, which, when Liquid Nitrogen runs through will freeze water forming an ice cover for a dike break or dam rupture, and, not shown, allow for repair while frozen and then melting the ice when dike or dam is fixed.

FIG. 9 shows a make-shift piping arrangement built in place to match the size and contour of a dike or dam 86 which has ruptured 85 causing flooding below the dam from the reservoir of water retained by the dam or dike. Looking at the structure 8 consisting of a network of pipes with spools 82 that allow Liquid Nitrogen 1 passage to other pipes extending from the spool, it is fed Liquid Nitrogen through the funnel 10 which passes through the pipes 8 which cool the water 61 in its vicinity to freezing. The resulting evaporant, gaseous Nitrogen 2, passes out of the pipe network at exhaust pipes 20. Depending on the flow speed of the water at the break 85, the pipe network 8 can be cooled at the break thus freezing to the dike or dam where it sits closing the opening by its presence before, in the line of water flow, the break 85, or, if the flow erodes the forming ice 84 forming, the pipe network 8 can be iced aside of the break in calmer waters and then with ropes attached be pulled into the flow stream going through the break 85 to cover the break and there ice itself to the high water side of the dam or dike. Liquid Nitrogen dewar 16 can arrive by barge or truck with pumps inside the dewar forcing Liquid Nitrogen in the cryogenic hose 13 feeding the Liquid Nitrogen 1 to the funnel 10 and into the pipe network 8. If a space can be architected into the pipe network between the ice and the dam or dike structure, the break 85 can be repaired while the ice 61 is in place. During repairs, the Liquid Nitrogen flow into the pipe network must be maintained. Once the repair to the break is completed and set, Liquid Nitrogen can be withheld so the ice melts and the pipe network 8 can be pulled from the water and dissembled and stored for another event when it is needed.

During writing of the original Liquid Nitrogen Enabler patent submitted May 14, 2003, a dike on a Michigan Upper Peninsula river flowing into Lake Superior ruptured emptying a reservoir of water into a town on the shore flooding the community. The raging waters filled that area of the Lake with silt. Power generation feeding the region south to include Green Bay Wis. was affected by the loss of water in the reservoir. This technique applied early in the situation might have reduced the damage the dike breakage cost. This US Army Corps of Engineers structure was old and monitoring its condition had been lax. Having this technique to recover from another breakage may make it safer for those downstream dikes and dams if and when they give way. It also will retain much of the water in the reservoir and prevent the flood damage downstream.

Figure 10:
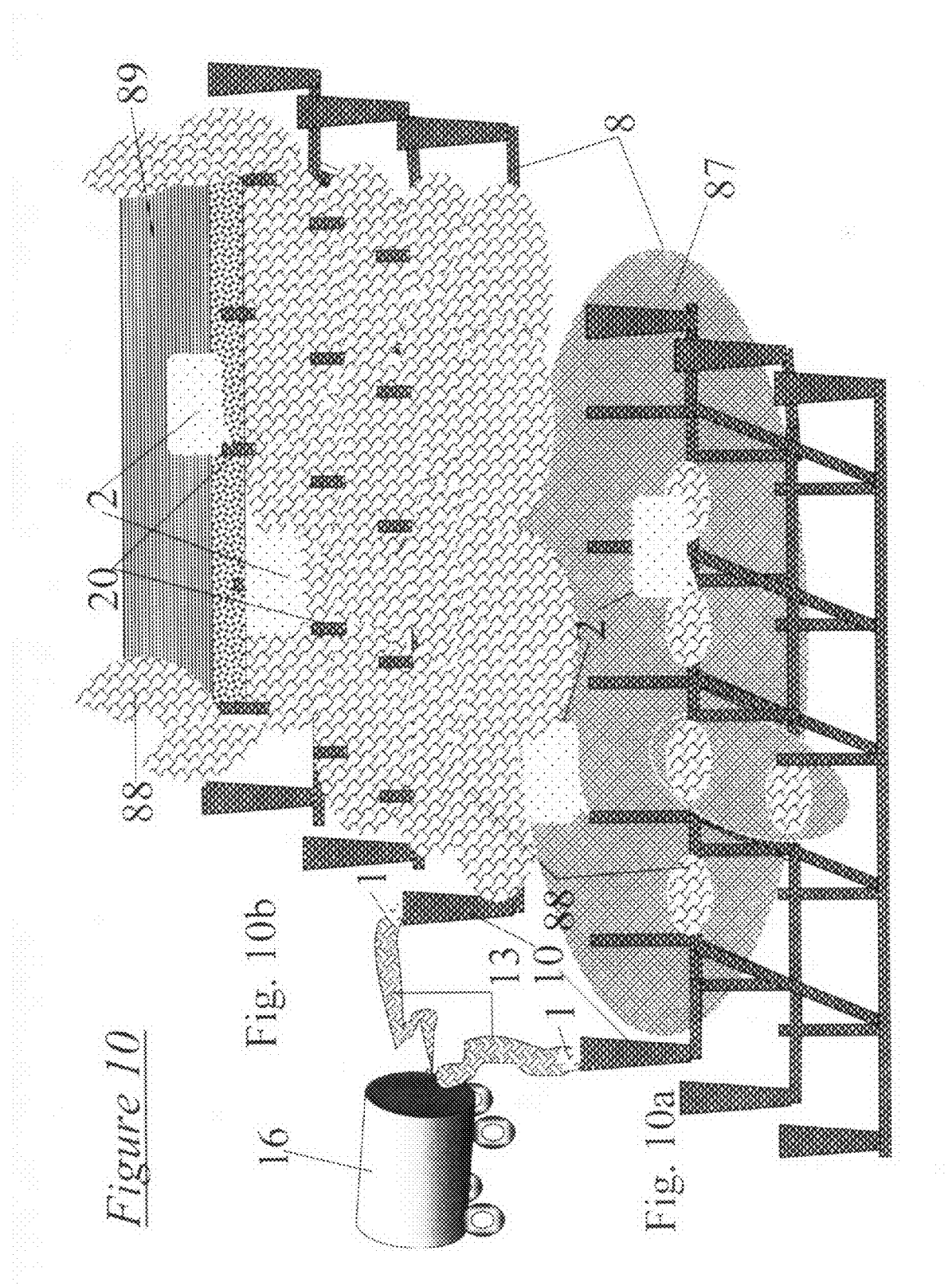
FIG. 10 is yet another pipe configuration which is designed to sculpture a lava flow when it reaches it, to allow a useful permanent structure once the lava flow solidifies.

FIG. 10 presents a scaffolding to sculpture lava flow into solid lava rock. It too is a pipe network 8 for Liquid Nitrogen 1 which is put in place where lava is anticipated to flow after the eruption of a volcano. The pipe scaffolding 8 can be erected well ahead of the lava flow 87. As the flow arrives, as shown in FIG. 10a, the hot flowing lava 87 encounters the super cold pipe network cooled by the flow of Liquid Nitrogen 1 from the dewar 16 via the cryogenic hoses 13 pouring it into the funnel ends 10 on the pipe network 8 with gaseous Nitrogen 2 escaping the pipe network through the open vertical pipes 20. The Liquid Nitrogen application to the pipe network should anticipate the lava flow arrival 87 by a few hours to insure a complete cooling of the pipe network. Without that the pipes will melt with the super high temperature of the lava flow. As the lava 87 encounters the cryogenically cold pipe network, it solidifies around the pipes forming solid lava rock 88. The rock is cooled with continuing Liquid Nitrogen flow through the system solidifying more and more lava rock. After considerable time the structure can appear as shown in FIG. 10b where only the funnels 10 which are a distant outside the lava flow and the vertical Nitrogen gas exhaust pipes 20 show outside the lava rock. Clever planning of the structure of the solidified lava 88 can create a lake 89 above the lavabed 88 where future lava flows can solidify before overrunning the structured lavabed. Structures like this might protect villages down mountain from frequently erupting volcanos or can protect villages from the current lava flow by arresting the flow as shown. Post eruption, these sites can be developed taking advantage of the pipe infrastructure of the lavabed for providing wiring and water supplies as needed.

3. A Third Embodiment of the Present Invention

Figure 11:
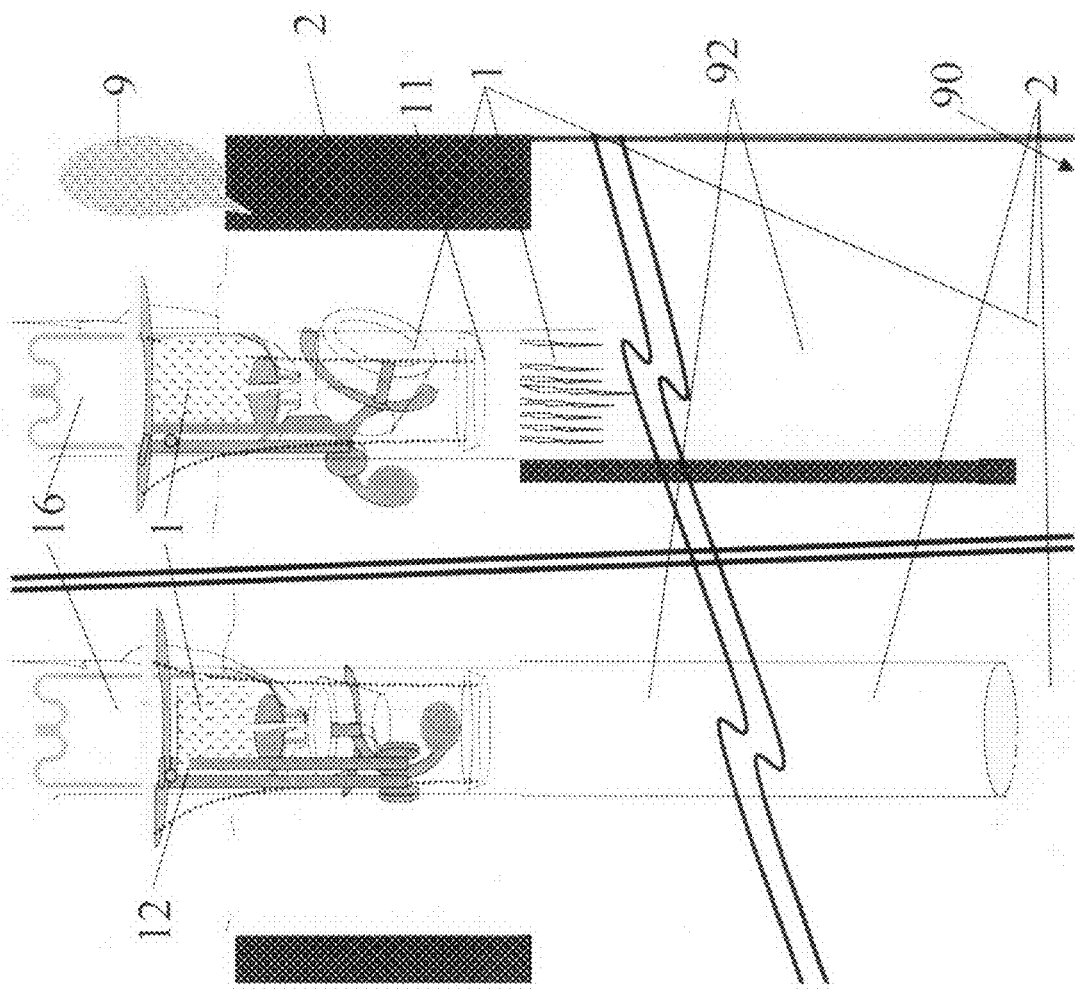
FIG. 11 shows the means to penetrate the ground around a coalmine fire with Nitrogen which reduces the burn until the fire is out. Flooding the mine with excess Liquid Nitrogen left in the truck will further hasten the coalmine fire control.

Turning now to FIGS. 11-12, a third embodiment of the present invention is illustrated wherein Liquid Nitrogen is used to flood the porous ground in the vicinity of long-burning coal mine fires and in capturing the water, Carbon dioxide and soot from smoke stack emissions, both providing means to maintain cleaner air. Once a coalmine fire is extinguished, the remaining coal can be mined. Once the stack gas from industry burning coal is processed rather than let go free in the atmosphere, the air will clear proportional to the captured gas vs. other emissions in the area.

FIG. 11 shows two coalmine fire mitigation drillings with separation between them recommended at 25 feet and depth of the drilling starting where the temperature is at boil water temperature 212° F. As the application of Liquid Nitrogen through the paced dispersion of the dispenser 12, the drilling bottom cools and further drilling takes the depth to again where water boils. This drilling cool when cooled is drilled further into the rock/soil layers over the coalmine until boiling water temperature is again reached. The drill routine continues until the holes penetrate to the mine below that is burning or to where the temperature does not reach boiling water. The Coalmine Fire Liquid Nitrogen dispenser 12 inverts the dewar 16 with a stop flow insert that trickles the Liquid Nitrogen 1 into the cup. When the cup is full, it drops by gravity emptying the Liquid Nitrogen 1 into the sieve unit 11 sending droplets of Liquid Nitrogen 1 down the drilling 92 where it evaporates into Nitrogen gas 2 filling the drilling and working its way into the porous rock above the coalmine fire 90. As long as the coalmine fire burns, coalmine fire emission 9 as a mix of water, Carbon dioxide and partially burned hydrocarbons is leaked into the air. The excess Liquid Nitrogen in the delivery truck before it returns for refill over the weeks of application, should empty its contents into the mine shaft of the burning coalmine. The entrances or tunnels between the burning area and outside or areas of the mine that are not burning should have tarpaulins blocking air passage into the coalmine fire tunnels. This way the evaporating Liquid Nitrogen emptied into the mine can increase the Nitrogen content of the air in the coalmine fire tunnel to the point that the Oxygen is depleted. This should stop the burn augmenting the flooding of the porous rock cover of the mine with Nitrogen gas as shown in FIG. 11 again depleting the Oxygen from the ground source above the mine. It is anticipated that several weeks of application working a large matrix of drillings 92 over the burning coal mine should mitigate the fire and eventually cause it to be extinguished. A bid to quell the Monroeville Pa. fire by drilling all the intersections of a 25 acre matrix over the mine with intersections occurring along lines at 25 foot sections was turned down in favor of surface mining the area until the entire burning coal volume was uncovered. This cost ten times the bid made using this method. Their excavation method reportedly did quell that coal mine fire. Pennsylvania still has eleven more coalmine fires that have burned for years. Perhaps budget considerations might give this method favor in the future. Colorado is reported to have about 250 actively burning coalmines and worldwide there are many more slowly emitting noxious substances and Carbon dioxide into the atmosphere.

FIG. 12 shows means to control industrial smoke stack emissions into the atmosphere. The inventor grew up in Green Bay Wis. where the paper mill smoke stacks belched noxious gases over the city aggravating her asthma condition throughout the year. Emerging economies are now plagued with these stack gas emissions throughout the world.

The theory behind the design of the stack gas scrubber is that the water in the air from the burning of coal or other heat processing burn carries the soot and other contaminants by adhesion. When water is crystallized into ice, its bonds release the soot as the ice forms on the condensing coils cooled to with Liquid Nitrogen to water freezing temperatures. Carbon dioxide will stay in gaseous form until it reaches around −109.3° F. so it can be released into controlled airflow conditions into a brightly lighted, plant filled environment where the Carbon dioxide is exchanged for Oxygen in photosynthesis making robust plant growth and reducing the Carbon dioxide emissions from the smoke stack/scrubber system.

Viewing one configuration for the scrubber system in FIG. 12, we have in FIG. 12a the current practice factory 94 with smoke stack 93 with smoke emission 9 spewing from the stack causing smoke stack gas 91 to flood the air. Installing the Liquid Nitrogen scrubber system as shown in FIG. 12b, we see the same factory 94 with an abbreviated smoke stack 93 covered with a roof from which three pipes emerge. The vertical pipe 99 drops soot into a barrel for reprocessing or use as soil. The diagonal pipe 97 disperses water into greenhouse 22 to irrigate the plants 24. The near horizontal pipe 98 releases Carbon dioxide into the greenhouse for consuming in photosynthesis by plants 24 during lighted conditions. The truck 23 is taking produce 25, fruit and vegetables, from the greenhouse 22 to market. And the greenhouse gases emitted from the greenhouse have reduced levels of Carbon dioxide and increased levels of Oxygen and the Nitrogen gas emitted in the cooling process. It is close to standard atmospheric content levels and does not induce smog conditions.

FIG. 12c shows the inner workings of the scrubber system with the smoke stack 93 abbreviated and capped to release its gas into the condensing coils 21 where, when they are cold, ice 96 forms as the water in the stack gas condenses and freezes. This freezing releases the soot in the stack gas which falls on the tarp feeding it into the soot pipe 99. The condensing coils 21 are cooled alternatingly by filling them from the dewars 16 when they are to cool down. The Liquid Nitrogen 1 flow stops so the stack gas can warm the coil allowing the ice 96 formed while the condensing coil 21 was cold will melt, drip down into the troughs feeding into the water pipe 97. The Carbon dioxide laden gas in the stack gas flows out of the scrubber structure in pipe 98 feeding that component into the greenhouse for photosynthesis to convert it to plant bulk and exchanging it for Oxygen. The condenser coils have the dewar 16 input of Liquid Nitrogen 1 and the outgas tubes 20 releasing Nitrogen gas 2 which exits either above the scrubber containment or inside mixing with Carbon dioxide carrying it at a less concentrated level into the greenhouse.

For safety of the workers in the greenhouse environment lower percentages of Carbon dioxide is preferred since breathing high concentrations of Carbon dioxide causes panting and really large lung capacity breathing that is not normal. Mixing the Nitrogen 2 and the Carbon dioxide will still feed the plants the Carbon dioxide, but its dilution will prevent the breathing frenzy in people and animals and any reaction plants might have to concentrated levels of Carbon dioxide. Greenhouse gas output will then be more in line with standard atmosphere air with Oxygen produced in photosynthesis, some escaping Carbon dioxide along with that given off in respiration, Nitrogen, and water vapor given off by the plants and evaporated from irrigating the soil or growth medium. This can clean the air if applied consistently over all the smoke stacks and other polluting burning in a region elected to have its air quality improved.

Many changes and modifications could be made to the invention without departing from the spirit thereof. The scope of some of these changes can be appreciated by comparing the various embodiments as described above. The scope of the remaining changes will become apparent from the appended claims.

I claim:

1. A method of using liquid nitrogen to control crises comprising the steps of:
   a. securing the liquid nitrogen in a carrier;
   b. dispensing the liquid nitrogen to an applying unit, wherein the applying unit is a generally either a pan or elongated structure and comprises a plurality of apertures and the liquid nitrogen flows unimpeded from the carrier into and through the applying unit; and c. applying liquid nitrogen to a situation needing cooling to control the crisis as droplets formed by gravity through the plurality of apertures of the applying unit evaporate and in so doing transfer the coldness to the air as the super cold, inert gas floods the space containing the crisis.

2. The method according to claim 1, wherein the carrier is a portable dewar and the applying unit is a pan with a plurality of apertures.

3. The method according to claim 1, wherein the carrier is a stationary tank mounted on a vehicle, located above the applying unit to dispense large quantities Liquid Nitrogen.

4. The method according to claim 1, further comprising the step of ensuring that the liquid nitrogen droplets are dispensed from a distance above the event such that the droplets have substantially evaporated as they fall prior to reaching the surface, resulting in the cryogenically cold gas cooling down the material it surrounds and filling the contained space.

5. The method according to claim 1, wherein a dispersal of Nitrogen can dilute (or cause to condense) a flammable gas or toxin to prevent combustion or explosion and illness of those in the environment of a toxic release.

6. The method according to claim 1, wherein the Nitrogen gas dispersal can be into a storm cloud to disrupt the formation of a dangerous local weather pattern with the applying unit.

7. A method of purging oxygen from a long term burn such as a coal mine fire, a probable explosion such as a saturated methane gas buildup, or a toxin release such as a chlorine gas buildup, comprising flooding a ground environment with liquid nitrogen such that the liquid nitrogen evaporates into Nitrogen gas, an inert gas and a fire suppressant, saturating the material such that the long term burn, probable explosion or toxin release is neutralized thereby.

* * * * *